United States Patent [19]

Schopper et al.

[11] 4,375,304
[45] Mar. 1, 1983

[54] DUAL-CIRCUIT PRESSURE CONTROL VALVES

[75] Inventors: Bernd Schopper, Frankfurt am Main; Derek Lowe, Glashuetten; Hans-Dieter Reinartz, Frankfurt am Main; Peter Tandler, Falkenstein, all of Fed. Rep. of Germany

[73] Assignee: ITT Industries, Inc., New York, N.Y.

[21] Appl. No.: 221,688

[22] Filed: Dec. 30, 1980

[30] Foreign Application Priority Data

Jan. 22, 1980 [DE] Fed. Rep. of Germany ....... 3002142

[51] Int. Cl.³ ............................................. B60T 15/06
[52] U.S. Cl. ........................................ 303/52; 60/591; 92/68; 137/636; 303/56
[58] Field of Search ...................... 92/68, 129; 60/571; 137/636; 303/6 A, 52, 56

[56] References Cited

U.S. PATENT DOCUMENTS

| 1,755,595 | 4/1930 | Craig | 92/68 |
|---|---|---|---|
| 2,705,971 | 4/1955 | Dorkins | 137/636 |
| 2,907,550 | 10/1959 | Heinish | 137/636 |
| 3,125,000 | 3/1964 | Reuter | 92/68 |
| 3,131,573 | 5/1964 | Bent | 137/636 |
| 3,133,473 | 5/1964 | Garrison | 92/129 |
| 3,253,518 | 5/1966 | Duemler | 92/68 |
| 3,605,814 | 9/1971 | Gordon | 137/636 |
| 3,766,835 | 10/1973 | Kobelt | 92/68 |
| 3,965,798 | 6/1976 | Estlick | 92/68 |
| 4,080,992 | 3/1978 | Niederer | 137/636 |
| 4,200,340 | 4/1980 | Margetts | 303/6 A |

FOREIGN PATENT DOCUMENTS 553603 5/1943 United Kingdom ................ 137/636

Primary Examiner—Abraham Hershkovitz
Attorney, Agent, or Firm—John T. O'Halloran; Alfred C. Hill

[57] ABSTRACT

Dual circuit pressure control valves for brake system are known in which the control pistons are located parallel to each other with each control piston controlling a different one of two brake circuits. Both control pistons are loaded by a common preloading force. The known arrangement is complicated in its construction and has a large overall length. According to the present invention, the construction is simplified and the overall length is reduced by providing a torsion spring which provides the preloading force acting on the control pistons via stationarily supported swivelling levers.

6 Claims, 3 Drawing Figures

U.S. Patent    Mar. 1, 1983    4,375,304
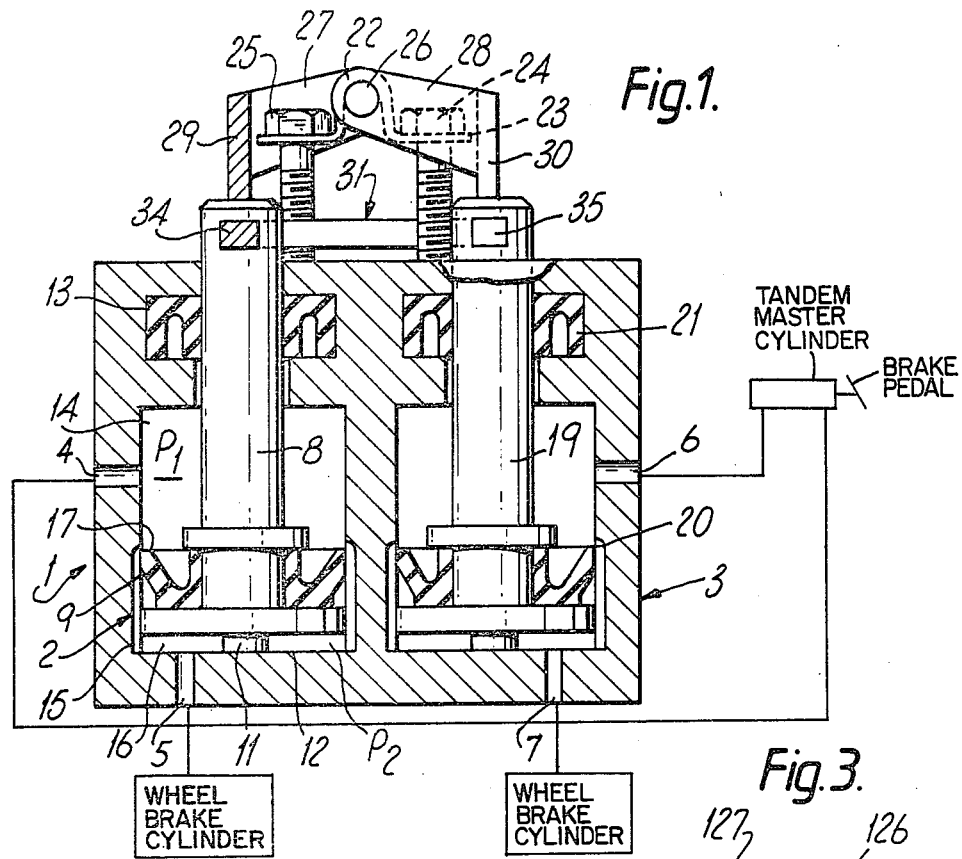
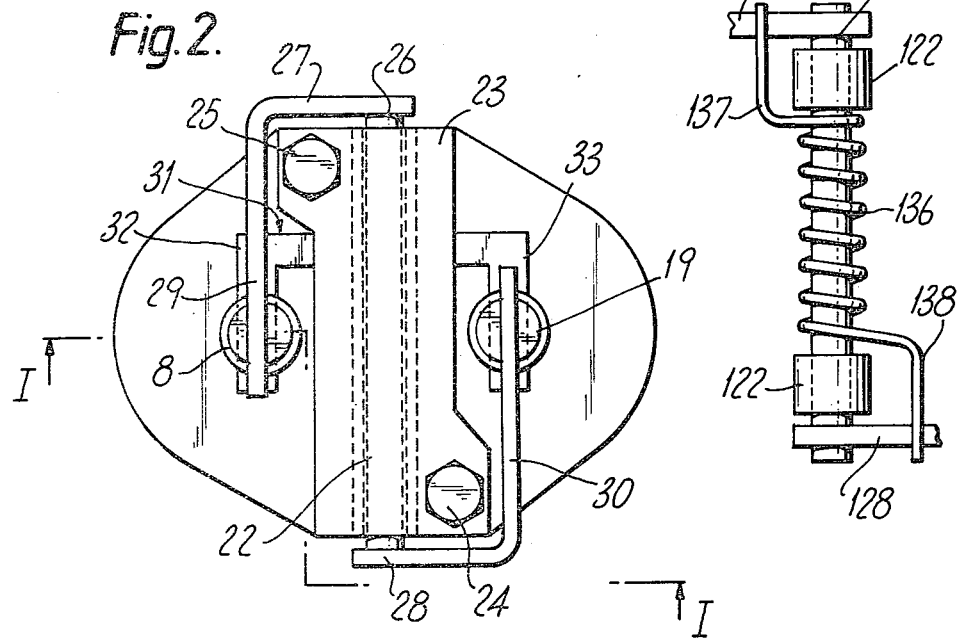

DUAL-CIRCUIT PRESSURE CONTROL VALVES

BACKGROUND OF THE INVENTION

The present invention relates to a dual-circuit pressure control valve for use in hydraulic brake systems having two control pistons arranged in parallel side by side and each assigned to a different one of two brake circuits, each of the control pistons being loaded by a preloading force.

There are known pressure control valves of the aforementioned type (German Patent DE-OS 2,748,699), in which a common helical spring acts via a distribution element on the end surfaces of the two control pistons for generating the preloading forces. In this case, a correspondingly large space has to be provided in the axial direction for the distribution element and the helical spring.

SUMMARY OF THE INVENTION

It is an object of the present invention to provide a pressure control valve of the type referred to hereinabove which is dimensioned smaller, in particular, with respect to its axial length.

A feature of the present invention is the provision of a dual-circuit pressure control valve comprising: two control pistons disposed in a housing in a parallel side-by-side relationship, each of the two pistons controlling a different one of two brake circuits; and an arrangement to provide a preloading force for each of the two pistons including two stationarily supported swivelling levers each associated with a different one of the two pistons, and a torsion member pressing each of the two swivelling levers in a direction toward an associated one of the two pistons.

The swivelling levers may be supported approximately at the level of the control piston's end surface. The torsion spring includes an axle extending parallel to the axis of rotation of the spring. Consequently, the height of the preloading device and, hence, the axial length of the pressure control valve are kept relatively small.

In particular, the swivelling levers may be adapted to swivel around a common axis. This results in a further simplification of construction.

It is advisable in this arrangement to have the common axis extend between the axes of the two pistons, hence, providing a symmetrical arrangement. Thus, the space between the pistons is utilized in a space-saving manner.

It is possible to load the swivelling levers by a common torsion member, which will result in further economies.

For example, the swivelling levers can be fastened to the end portions of a preloaded, stationarily supported torsion rod. In another possibility, a leg spring bears against the two swivelling levers in an opposite direction.

It is desired in such a pressure control valve that—upon failure of the one circuit—the changeover point of the other circuit be increased to a higher value. To this end a carrier bridge may be provided synchronizing the points of application of the preloading forces of the two swivelling levers by allowing a slight relative movement of the two pistons.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross-sectional view of a dual-circuit pressure control valve in accordance with the principles of the present invention taken along the line I—I of FIG. 2;

FIG. 2 is a top view of FIG. 1; and

FIG. 3 is a partial view of a modification of the control valve of FIGS. 1 and 2.

DESCRIPTION OF THE PREFERRED EMBODIMENT

In the embodiment of FIGS. 1 and 2, two pressure control valves 2 and 3 are located in a schematically drawn housing 1 each controlling the pressure in a different one of two brake circuits. Pressure control valve 2 is provided with an inlet 4 and an outlet 5 and pressure control valve 3 with an inlet 6 and an outlet 7. For example, inlets 4 and 6 are each connected to a different one of the two outlet pressure chambers of a tandem master cylinder operated by a brake pedal, while outlets 5 and 7 lead to a different one of the two rear-wheel brake cylinders of an automotive vehicle.

Pressure control valve 2 has a control piston 8 carrying a sealing sleeve 9 and pressed downwards by a specific preload. Control piston 8 will therefore have its lower end surface 11 in abutment with the housing bottom 12 in the rest position. Control piston 8 is sealed by seal 13 to housing 1. In the illustrated rest position, inlet chamber 14 is in communication with outlet chamber 16 via axial grooves 15. If, however, control piston 8 moves upwardly with rising pressure on account of its different effective pressure surfaces, rim 17 of sealing sleeve 9 will override the end of grooves 15 thereby separating inlet chamber 14 and outlet chamber 16 from each other, so that with the inlet pressure $P_1$ continuing to be increased, the outlet pressure $P_2$ will rise more slowly proportional to the ratio of the effective pressure surfaces of piston 8.

Similarly, pressure control valve 3 has a control piston 19 with a sealing sleeve 20. Control piston 19 is likewise sealed by a seal 21 to housing 1.

A sheet metal member 23 forming a bearing 22 is fastened to housing 1 by screws 24 and 25. An axle 26 is supported in bearing 22. Axle 26 carries on its one end portion a L-shaped swivelling lever 27 and on its other end portion a L-shaped swivelling lever 28. Both swivelling levers 27 and 28 are provided with pressure members 29 and 30, respectively, extending parallel to axle 26, which pressure members abut the end surface of control pistons 8 and 19, respectively.

In the present embodiment, the torsion member is axle 26 constructed as a torsion rod. This torsion rod is twisted at both ends thereof to store a predetermined amount of energy in each end thereof to provide a downward preloading force for each of control pistons 8 and 19. In effect, each end of the torsion rod acts conventionally as a spring and acts through pressure members 29 and 30 to hold control pistons 8 and 19 in the illustrated rest position. Once pressure in the outlet chamber 16 exceeds the preloading force of the associated end of the torsion rod pistons 8 and 19 can move upward against the preloading force to interrupt the connection between inlet chamber 4 and outlet chamber 16. The changeover point in normal operation is determined by the torsion rod. In the event of one brake circuit failing, the control piston of the other brake circuit will be continued to be loaded by the same amount of preloading force.

If it is desired upon failure of the one brake circuit to increase the changeover point for the other brake circuit, there may be provided a carrier bridge 31 constructed as a U-shaped part of square cross-section having two legs 32 and 33 each engaging a different one of the square holes 34 and 35 of control pistons 8 and 19, respectively. The engagement is effected by a loose sliding fit so that both control pistons 8 and 19 are permitted to move slightly relative to each other during normal operation. However, a synchronizing coupling becomes effective upon exceeding this slight relative movement. In this case, the control piston of the unpressurized brake circuit will be entrained through carrier bridge 31 by the control piston of the other brake circuit resulting in both end portions of the torsion rod being active again, but this time producing an effect in only the operative brake circuit.

In summary, the operation of the dual-circuit pressure control valve is as follows. At rest the pistons 8 and 19 are in the position illustrated in FIG. 1 with the inlets 4,6 being coupled to the outlets 5,7 via axial grooves, such as groove 15. As the inlet pressure increases, pistons 8 and 19 will move upwardly due to pistons 8 and 19 having a larger effective surface in the outlet chambers, such as chamber 16, than the effective surface of pistons 8 and 19 in the inlet chambers, such as chamber 14. This upward movement of pistons 8 and 19 is against the preload force provided by the torsion rod and associated swivelling levers 27 and 28. Continued upward movement of pistons 8 and 19 will cause the rim of the sealing sleeve, such as rim 17 of sleeve 9 to override the end of the axial grooves thereby separating the inlet chamber from the outlet chamber. A continued inlet pressure $P_1$ increase will result in a slower rise in outlet pressure $P_2$ proportional to the ratio of the effective surfaces of pistons 8 and 19. After separating the inlet chamber from the outlet chamber and with a further increase in pressure $P_1$, pistons 8 and 19 will move downward to again connect the inlet chamber to the outlet chamber only after a downward force is applied to pistons 8 and 19, determined by increased pressure $P_1$ acting on the smaller effective surface of pistons 8 and 19 in the inlet chamber, overcoming the upward force of pistons 8 and 19 provided by pressure $P_2$ and the larger effective surface of pistons 8 and 19 in the outlet chamber. Once the inlet chamber is connected to the outlet chamber, $P_2$ will approach the value of pressure $P_1$ and again will result in an upward movement of pistons 8 and 19 due to the difference of the effective surfaces in the inlet and outlet chamber. These effective surfaces are selected such that a considerable increase in pressure $P_1$ is required before a downward movement of pistons 8 and 19 can be accomplished and that an upward movement of pistons 8 and 19 is accomplished when pressure $P_2$ approaches that of pressure $P_1$. Thus, due to the delay in pressure $P_1$ causing a downward movement of pistons 8 and 19, pressure $P_2$ rises slower than the inlet pressure $P_1$.

If one of the brake circuits fails there will be no pressure associated with the pistons 8 or 19 present in the failed brake circuit and the piston of the operative brake circuit will be able to operate as before due to the torsion bar arrangement for preloading the control pistons.

As mentioned above, the bridges 31 enables increasing the changeover point for the operative brake circuit by the entraining of the inoperative control piston to the operative control piston after overcoming the built in relative movement of the two control pistons afforded by their connection to bridge 31.

In the embodiment according to FIG. 3, the two swivelling levers 127 and 128 are held rotatably on a rigid axle 126 which is fastened to housing 1 by clamps 122. Axle 126 is encompassed by a coiled leg spring 136. The one leg 137 acts on the one swivelling lever 127, the other leg 138 acts on the other swivelling lever 128. The mode of operation is similar to that of the embodiment according to FIGS. 1 and 2.

The illustrated dual-circuit pressure control valve may have various control functions, for example, the function of a limiting valve keeping the outlet pressure at a constant level in the event of rising inlet pressure above the changeover point, or the function of a pressure-reducing valve causing the outlet pressure to rise more slowly in the event of rising inlet pressure above the changeover point.

While we have described above the principles of our invention in connection with specific apparatus, it is to be clearly understood that this description is made only by way of example and not as a limitation to the scope of our invention as set forth in the objects thereof and in the accompanying claims.

We claim:

1. A dual-circuit pressure control valve for a dual-circuit brake system to control braking pressure therein comprising:
   two control pistons disposed in a housing in a parallel side-by-side relationship, each of said two pistons having a longitudinal axis and a valve associated therewith to control braking pressure in a different one of said dual brake circuits; and
   an arrangement to provide a preloading force for each of said two pistons including
      an axle disposed adjacent an end of each of said two pistons and between said adjacent ends of said two pistons in a perpendicular relationship to an imaginary line interconnecting said longitudinal axes of said two pistons, and
      two preloaded L-shaped swivelling levers each associated with and pressed in a direction toward a different one of said two pistons, one leg of one of said two swivelling levers being connected to one end of said axle and one leg of the other of said two swivelling levers being connected to the other end of said axle, the other leg of each of said two swivelling levers being parallel to said axle bearing on said adjacent end of said associated one of said two pistons to provide a preloading force for said associated one of said two pistons.

2. A control valve according to claim 1, wherein said two swivelling levers are preloaded by a common torsion member.

3. A control valve according to claim 1, wherein said axle is a preloaded, stationarily supported torsion rod to preload said two swivelling levers.

4. A control valve according to claim 3, further including
   a carrier bridge interconnecting said two pistons to synchronize the points of application of said preloading forces of said two swivelling levers by permitting a slight relative movement between said two pistons during normal braking operation.

5. A control valve according to claim 2, wherein said common torsion member is a leg spring encircling said axle having legs on opposite ends thereof bearing against said two swivelling levers.

6. A control valve according to claim 5, further including
a carrier bridge interconnecting said two pistons to synchronize the points of application of said preloading forces of said two swivelling levers by permitting a slight relative movement between said two pistons during normal braking operation.

* * * * *